(12) United States Patent
Nakamura et al.

(10) Patent No.: US 6,368,534 B1
(45) Date of Patent: Apr. 9, 2002

(54) SOLUTION CASTING PROCESS

(75) Inventors: Toshikazu Nakamura; Yukihiro Katai, both of Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/612,245

(22) Filed: Jul. 7, 2000

(30) Foreign Application Priority Data

Jul. 7, 1999 (JP) .......................................... 11-193446

(51) Int. Cl.$^7$ .............................. C08J 5/18; B29C 41/24
(52) U.S. Cl. ...................... 264/216; 264/207; 264/556; 264/571
(58) Field of Search ................................ 264/212, 216, 264/217, 556, 207, 571

(56) References Cited

U.S. PATENT DOCUMENTS 3,520,964 A * 7/1970 Metz, Jr. .................... 264/216
4,783,304 A * 11/1988 Heyer ......................... 264/216
5,393,571 A * 2/1995 Suga et al.
6,120,278 A * 9/2000 Zimmermann et al. ..... 264/216

FOREIGN PATENT DOCUMENTS

| EP | 547 562 | * 6/1993 |
| JP | 63-254136 | * 10/1988 |
| JP | 2-52721 | * 2/1990 |

* cited by examiner

Primary Examiner—Mathieu D. Vargot
(74) Attorney, Agent, or Firm—Sughrue Mion, PLLC

(57) ABSTRACT

This invention relates to a solution casting process capable of decreasing uneven coating of a functional layer upon applying the functional layer onto a film surface, which comprises casting a solution of polymer dissolved in organic solvent into a film by extruding from a die onto a support, wherein the length of the film from the die opening to the landing of the film on the support is controlled to 3 to 40 mm.

9 Claims, 3 Drawing Sheets

SOLUTION CASTING PROCESS

BACKGROUND OF THE INVENTION

This invention relates to a solution casting process capable of decreasing uneven coating of a functional layer upon applying the functional layer onto a film surface.

Films used in optical field are produced using cellulose triacetate film or the like as the support film, and the cellulose triacetate film and a the like are produced through the solution casting process. In the solution casting process, a polymer solution dissolved in organic solvent is cast from a die onto a support, such as a drum or an endless band, while a ribbon (a film of the solution between the die opening and the landing point of the film at the support) is allowed to adhere closely to the support by a vacuum chamber located in the vicinity of the die. Various improvements have been made in the solution casting process, and for example, Japanese Patent KOKOKU 49-36946 discloses a casting process of a liquid composition so as to contact the flow of the liquid composition closely with a roller by providing a vacuum chamber having two suction rooms, in order to prevent air entrapping. Japanese Patent KOKOKU 62-38133 and 63-57222 disclose a uniform pressing apparatus for a web capable of stabilizing end beads by providing two vacuum zones separated by a partition wall. Japanese Patent KOKAI 5-66212 discloses a casting process which prevents the generation of skimming by using a dope containing a good solvent and a poor solvent at a specific ratio.

However, in the above conventional processes, the ribbon vibrates at a certain frequency caused by the wind pressure vibration, mechanical vibration or the like due to the air column vibration in a vacuum chamber, the air column vibration in a suction duct or the vibration of the vacuum chamber by the vibration of a blower, and thereby, continuous or periodic step-shaped thickness variation occurs.

Incidentally, films used in optical field have an antiglare coating in order to add a hard coating or reflection-reducing to the film. Uneven thickness existing on a support film induces uneven coating of the antiglare layer to degrade appearance and functions of the films. Nevertheless, it is very difficult to remove the above vibration sources.

SUMMARY OF THE INVENTION

An object of the invention is to provide a process for solution coating capable of producing a film having a small unevenness in thickness, and thereby, not inducing uneven coating of various functional layers on the film.

The inventors investigated eagerly in order to achieve the above object, and found that the length-of the ribbon influences the generation of the uneven thickness, and the unevenness in thickness can be reduced to the degree of not appreciating uneven coating by adjusting the length of ribbon to a particular range.

That is, concerning step-shaped uneven thickness with a pitch in the range of 5 to 30 mm in the longitudinal direction in the films produced by the solution casting process, the inventors investigated the relationship between the pitch a mm of uneven thickness and (b/c)×100 (uneven thickness rate) wherein b $\mu$m (uneven thickness) is the difference between the highest position and the lowest position in the uneven thickness, and c $\mu$m is the (mean) thickness of the support film. The results obtained are shown in FIG. 1. In FIG. 1, ○ indicates that uneven coating cannot be seen, △ indicates that =uneven coating can be seen slightly, and × indicates that uneven coating can be seen, evaluated by visual observation. From the results, they found that, in the range of a pitch of uneven thickness of 5 to 30 mm, uneven coating cannot be seen by rendering the length of a ribbon 3 to 40 mm to complete the invention.

Thus, the present invention provides a process for solution casting which comprises casting a solution of polymer dissolved in organic solvent into a film by extruding from a die onto a support, wherein the length of the film from the die opening to the landing of the film on the support is controlled to 3 to 40 mm.

In the above results of FIG. 1, the vibration sources around the ribbon are necessary to restrict the vibration quantity of the die to 0.02% or less of the distance between the die and the support, the irregularity of the velocity of the support to 0.02% or less of the velocity of the support, and the pressure pulsation in the delivery of the dope to 0.3% or less of the irregularity of the frequency which makes the pitch of uneven thickness 30 mm or more.

Figure 1:
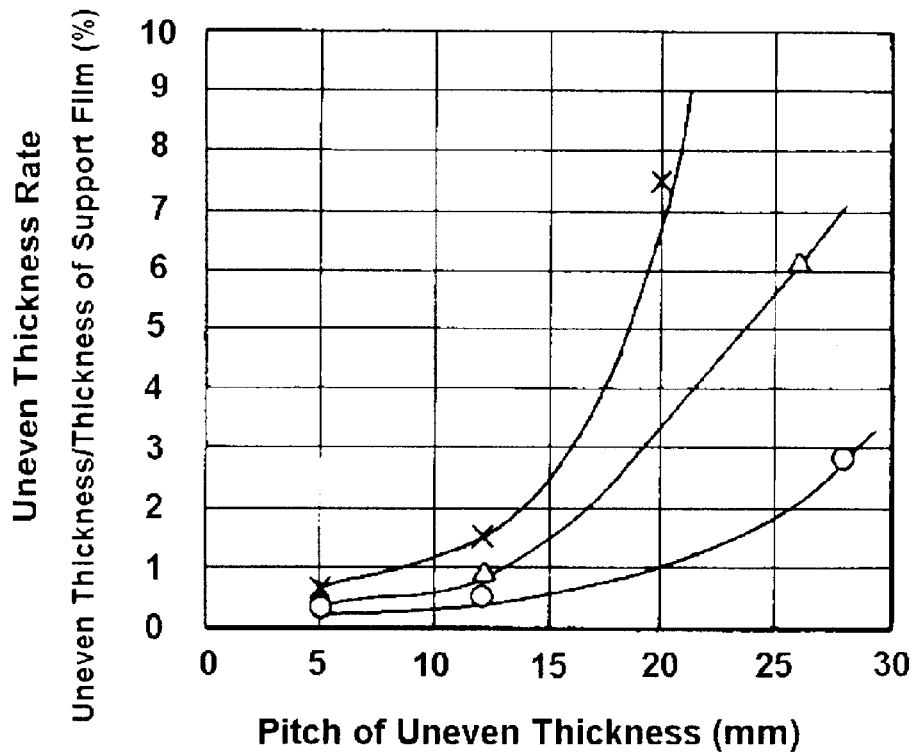
FIG. 1 is a graph indicating the relationship between uneven thickness rate and pitch of uneven thickness with respect to the appreciation of uneven coating through visual observation.

1 . . . Casting die
11~13 . . . Manifold
14 . . . Slot
15 . . . End opening (die opening)
16 . . . Feed block
17 . . . Passage
2 . . . Support
21 . . . Band
22 . . . Drum
23 . . . Rotary drum
3 . . . Vacuum chamber
4 . . . Ribbon
5 . . . Suction duct
6 . . . Buffer tank
7 . . . Blower

DETAILED DESCRIPTION OF THE INVENTION

In the process of the invention, the length of the ribbon is controlled to 3 to 40 mm, preferably 7 to 25 mm, more preferably 8 to 15 mm. The ribbon length of less than 3 mm makes the ribbon unstable caused by the steep casting. The ribbon length of exceeding 40 mm renders uneven coating conspicuous. The shape of the ribbon is usually curved, and the length of the ribbon is measured by taking a photograph or the like.

Figure 2:
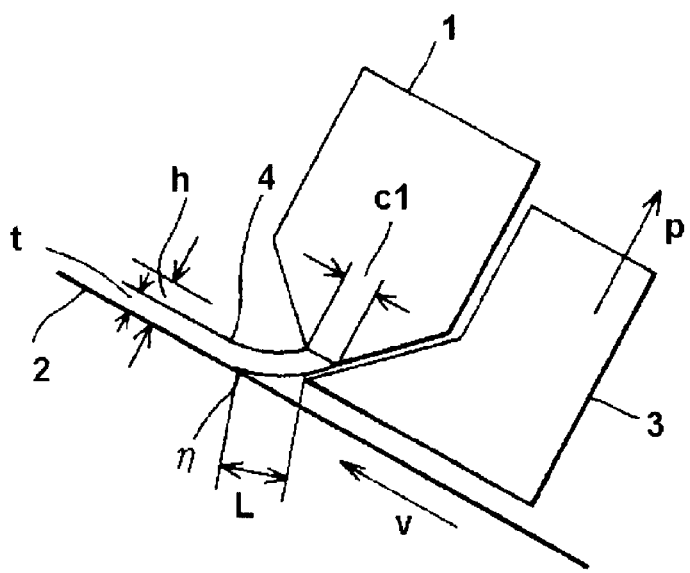
FIG. 2 is a schematic side view illustrating casting state of a dope from a die.

The control method of the ribbon length is explained with reference to FIG. 2. In FIG. 2, 1 is a casting die, 2 is a support, such as a band or a drum, 3 is a vacuum chamber, and 4 is a ribbon.

As the factors for controlling the length of the ribbon, there are ① the gap h between the casting die 1 and the support (band or drum) 2, ② suction pressure p of the vacuum chamber 3, ③ viscosity η of dope (ribbon) 4, ④ lip clearance cl of the casting die 1, ⑤ casting speed v (traveling speed of a support 2, ⑥ thickness t of a cast (support) film 4, and the like.

The length of the ribbon 4 can be shortened by shortening the gap h between the casting die 1 and the support 2, raising the suction pressure p of the vacuum chamber 3, increasing the dope viscosity η, narrowing the die lip clearance cl, lowering the casting speed v, thickening the thickness t of the cast film 4, or the like. The length of the ribbon 4 can be lengthened by operating opposite to above. The length of the ribbon is controlled to 3 to 40 mm by employing one or more of the above operations. Moreover, any other means can be employed for the control of the ribbon length.

A suitable gap h between the casting die and the support is, in general, 1 to 10 mm, preferably 1.5 to 6 mm.

A suitable suction pressure p of the vacuum chamber is, in general, −1 to −50 mm Aq (1 mm Aq=9.80665 Pa), preferably −2 to −30 mm Aq.

A suitable viscosity η is in general, 10 to 1,000 poises (at the casting temperature of dope), preferably 100 to 800 poises A suitable lip clearance cl is, in general, 0.2 to 3 mm, preferably 0.5 to 2 mm.

A suitable casting speed v is, in general, 3 to 150 m/min, preferably 10 to 100 m/min.

A suitable film thickness t is, in general, 20 to 500 $\mu$m, preferably 30 to 300 $\mu$m, more preferably 35 to 200 $\mu$m.

Illustrative of the polymers suitable for the invention are cellulose triacetate, cellulose diacetate, and the like, and illustrative of the organic solvents are methylene chloride, methanol, butanol, acetone, and the like.

The solution casting apparatus for carrying out the invention may be a solution casting apparatus using a mirror-finished cast band or a solution casting apparatus using a mirror finished cast drum. A solution casting apparatus using a cast band is shown in FIG. 3, and a solution casting apparatus using a mirror-finished cast drum is shown in FIG. 4.

Figure 3:
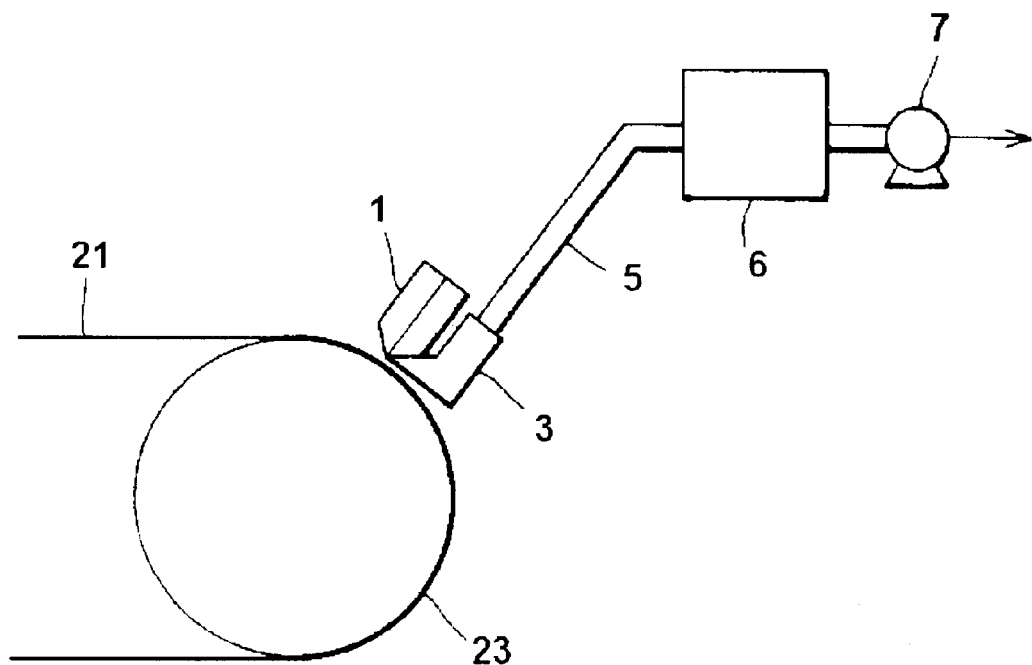
FIG. 3 is a schematic side view of a solution casting apparatus to which process of the invention is applied.

The solution casting apparatus shown in FIG. 3 comprises a casting die 1, a pair of rotary drums 23, an endless band 21 traveling between the rotary drums 23, a vacuum chamber 3 located adjacent to the casting die 1, and a suction duct 5, a buffer tank 6 and a blower 7 connected to the vacuum chamber 3 in this order.

Figure 4:
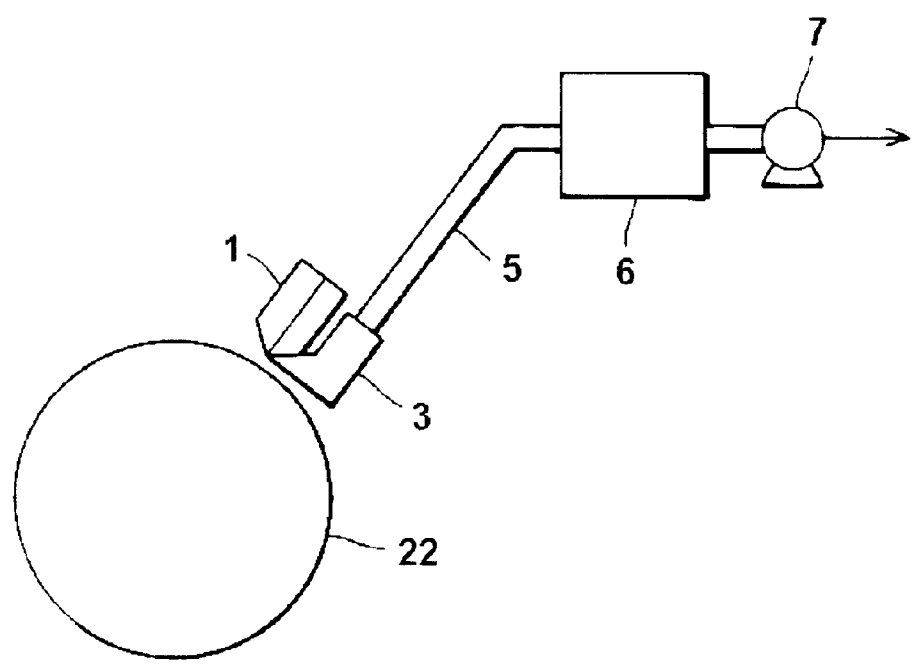
FIG. 4 is a schematic side view of another solution casting apparatus to which process of the invention is applied.

The solution casting apparatus shown in FIG. 4 uses a cast drum 22 instead of the cast band 21 and a pair of the rotary drums 23.

Figure 5:
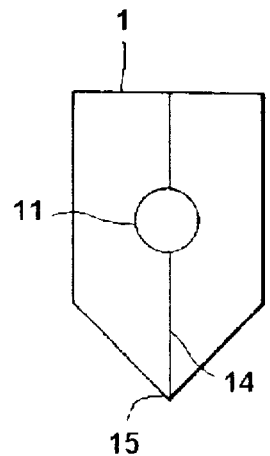
FIGS. 5–7 are a schematic section of various casting dies.
Figure 6:
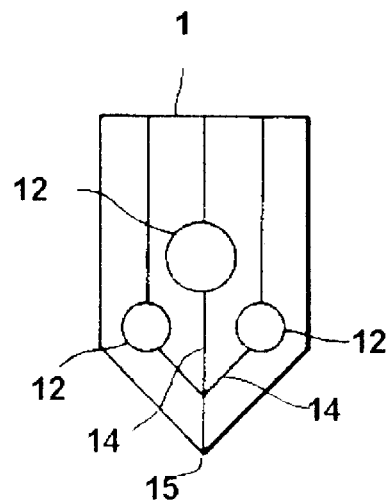
Figure 7:
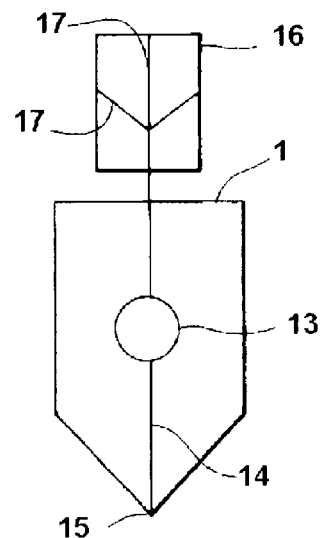

The casting die 1 in the apparatus of FIG. 3 and 4 has a schematic structure shown in FIG. 5. The die 1 is used for casting a single layer film, and has a manifold 11 at the center and a slot 14 connecting the manifold 11 and the end opening 15 of the die. The casting dies 1 shown in FIG. 6, 7 are also usable. The die 1 of FIG. 6 is used for casting a multiplayer (triple layer) film, and has three manifolds 12, 12, 12 and slots 14, 14, 14, which meet on their midway to be integrated into one slot, connecting the manifolds and the end opening 15. The die 1 of FIG. 7 is also used for casting a multiplayer (triple layer) film, and has a feed block 16 where three passages 17 are met at the inside of the feed block 16.

The above dies are coathanger type dies, and any other type die, such as T die, is also applicable.

According to the invention, even if it is very difficult to remove vibrations around the ribbon through casting a film, i.e. vibration remains, uneven thickness can be reduced by controlling the length of the ribbon in the range of 3 to 40 mm, preferably 7 to 25 mm. As a result, uneven coating of functional layers, such as an antiglare layer and an orientation layer, becomes small to improve appearance and functions.

EXAMPLES

Materials and conditions employed in the examples are as follows:

| Dope (Solution of Polymer) | (parts by weight) |
| --- | --- |
| Cellulose triacetate | 100 |
| Triphenyl phosphate | 10 |
| Biphenyl diphenyl phosphate | 5 |
| Methylene chloride | 400 |
| Methanol | 70 |
| η-Butanol | 2 |
| Film thickness after drying | 40–150 $\mu$ m |
| Degree of pressure reduction in vacuum chamber | −2—−50 mm Aq |

| Dope of substream on cocasting | (parts by weight) |
| --- | --- |
| Cellulose triacetate | 100 |
| Triphenyl phosphate | 10 |
| Biphenyl diphenyl phosphate | 5 |
| Methylene chloride | 500 |
| Methanol | 90 |
| η-Butanol | 3 |
| Layer thickness of main stream (after drying) | 76 $\mu$ m |
| Layer thickness substreams (after drying) (both surface layers) | each 2 $\mu$ m |

Example 1

Casting was carried out under the following conditions:

| | |
| --- | --- |
| Gap h between die and support | 3.5 mm |
| Suction pressure p of vacuum chamber | −20 mmAq |
| Viscosity of Dope η | 200 poise |
| Die lip clearance cl | 0.9 mm |
| Casting speed v | 50 m/min |
| Film thickness t | 80 $\mu$ m |

Upon casting, the length of the ribbon was 8 mm, and b/c (uneven thickness rate) and a (pitch of uneven thickness) were 0.6% and 12 mm, respectively. Uneven coating could not be seen.

Example 2

Casting was carried out under the following conditions:

| | |
| --- | --- |
| Gap h between die and support | 5 mm |
| Suction pressure p of vacuum chamber | −5 mmAq |
| Viscosity of Dope η | 300 poise |
| Die lip clearance cl | 1.0 mm |
| Casting speed v | 50 m/min |
| Film thickness t | 80 $\mu$ m |

Upon casting, the length of the ribbon was 23 mm, and b/c and a were 1.8% and 25 mm, respectively. Uneven coating could hardly be seen.

Example 3

Casting was carried out under the following conditions:

| | |
|---|---|
| Gap h between die and support | 3.5 mm |
| Suction pressure p of vacuum chamber | −20 mmAq |
| Viscosity of Dope η | 200 poise |
| Die lip clearance cl | 0.9 mm |
| Casting speed v | 50 m/min |
| Film thickness t | 40 μm |

Upon casting, the length of the ribbon was 10 mm, and b/c and a were 0.75% and 15 mm, respectively. Uneven coating could not be seen.

Example 4

Casting was carried out under the following conditions:

| | |
|---|---|
| Gap h between die and support | 5.0 mm |
| Suction pressure p of vacuum chamber | −2 mmAq |
| Viscosity of Dope η | 300 poise |
| Die lip clearance cl | 1.4 mm |
| Casting speed v | 50 m/min |
| Film thickness t | 80 μm |

Upon casting, the length of the ribbon was 35 mm, and b/c and a were 3.5% and 30 mm, respectively. Uneven coating could hardly be seen.

Example 5

Casting was carried out under the following conditions:

| | |
|---|---|
| Gap h between die and support | 2 mm |
| Suction pressure p of vacuum chamber | −30 mmAq |
| Viscosity of Dope η | 200 poise |
| Die lip clearance cl | 0.7 mm |
| Casting speed v | 50 m/min |
| Film thickness t | 80 μm |

Upon casting, the length of the ribbon was 5 mm, and b/c and a were 0.6% and 8 mm, respectively. Uneven coating could hardly be seen.

Comparative Example 6

Casting was carried out under the following conditions:

| | |
|---|---|
| Gap h between die and support | 12 mm |
| Suction pressure p of vacuum chamber | −20 mmAq |
| Viscosity of Dope η | 300 poise |
| Die lip clearance cl | 1.4 mm |
| Casting speed v | 50 m/min |
| Film thickness t | 80 μm |

Upon casting, the length of the ribbon was 45 mm, and b/c and a were 15% and 35 mm, respectively. Uneven coating was seen.

Comparative Example 7

Casting was carried out under the following conditions:

| | |
|---|---|
| Gap h between die and support | 0.5 mm |
| Suction pressure p of vacuum chamber | −30 mmAq |
| Viscosity of Dope η | 200 poise |
| Die lip clearance cl | 0.7 mm |
| Casting speed v | 50 m/min |
| Film thickness t | 80 μm |

In this case, the ribbon was ruptured, and the cast film could not be made.

What is claimed is:

1. A process for solution casting which comprises casting a solution of polymer consisting essentially of cellulose triacetate dissolved in an organic solvent into a film by extruding from a die onto a support, wherein the length of the film from the die opening to the landing of the film on the support is controlled to 3 to 40 mm, and the gap between the die and the support is 1 to 10 mm.

2. The process of claim 1 wherein the length of the film is controlled to 7 to 25 mm.

3. The process of claim 1 which further comprises sucking the film extruded from the die by a vacuum chamber provided in the vicinity of the die on the upsteam side, wherein the suction pressure of the vacuum chamber is −1 to −50 mm Aq.

4. The process of claim 1 wherein the solution has a viscosity of 10 to 1,000 poises.

5. The process of claim 1 wherein the die has a lip clearance of 0.2 to 3 mm.

6. The process of claim 1 wherein the solution is cast into the film at a speed of 3 to 150 m/min.

7. The process of claim 1 wherein the film has a dry thickness of 20 to 500 μm.

8. A process for solution casting which comprises casting a solution of polymer consisting essentially of cellulose triacetate dissolved in an organic solvent into a film having a dry thickness of 20 to 500 μm by extruding from a die onto a support, wherein the length of the film from the die opening to the landing of the film on the support is controlled to 3 to 40 mm.

9. A process for solution casting which comprises casting a solution of polymer consisting essentially of cellulose triacetate dissolved in an organic solvent into a film by extruding from a die onto a support, wherein the length of the film from the die opening to the landing of the film on the support is controlled to 3 to 40 mm, and the film has uneven thickness with a pitch in the range of 5 to 30 mm.

\* \* \* \* \*